Dec. 7, 1954    J. M. FELTON ET AL    2,696,547
GRIPPING MEMBER FOR BONDING
Filed April 10, 1951    2 Sheets-Sheet 2
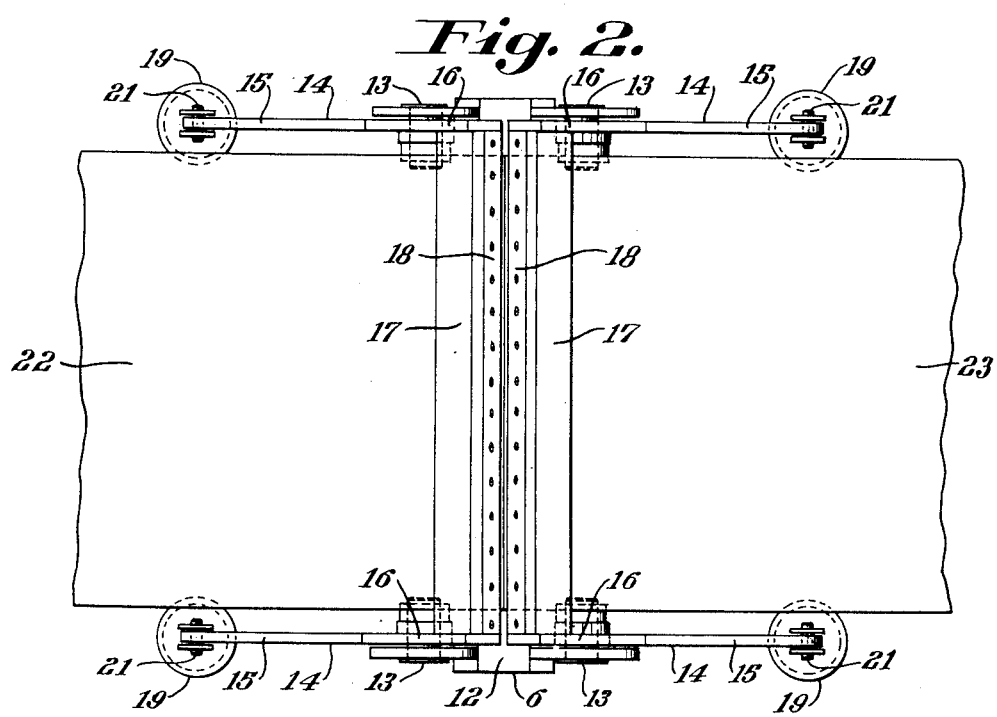
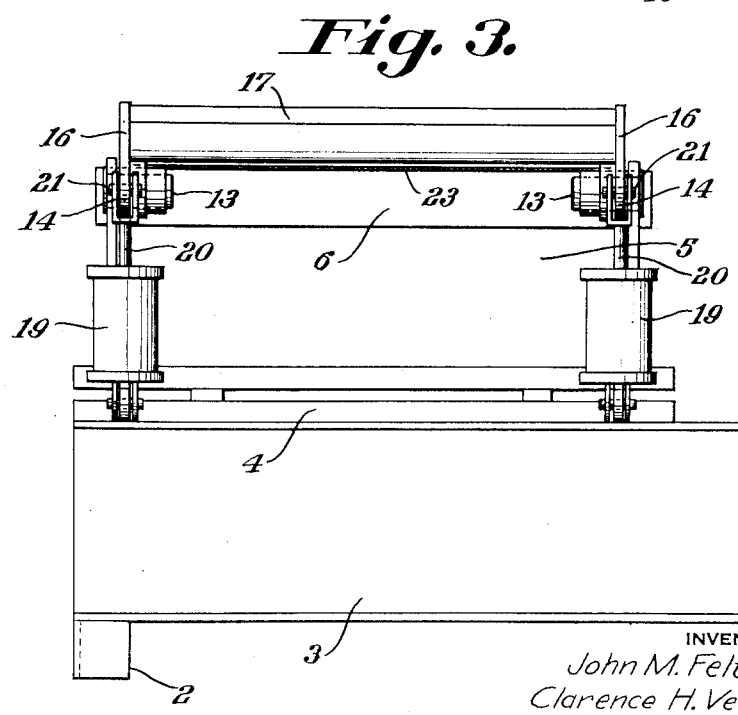
INVENTORS
John M. Felton, and
Clarence H. Verwohlt

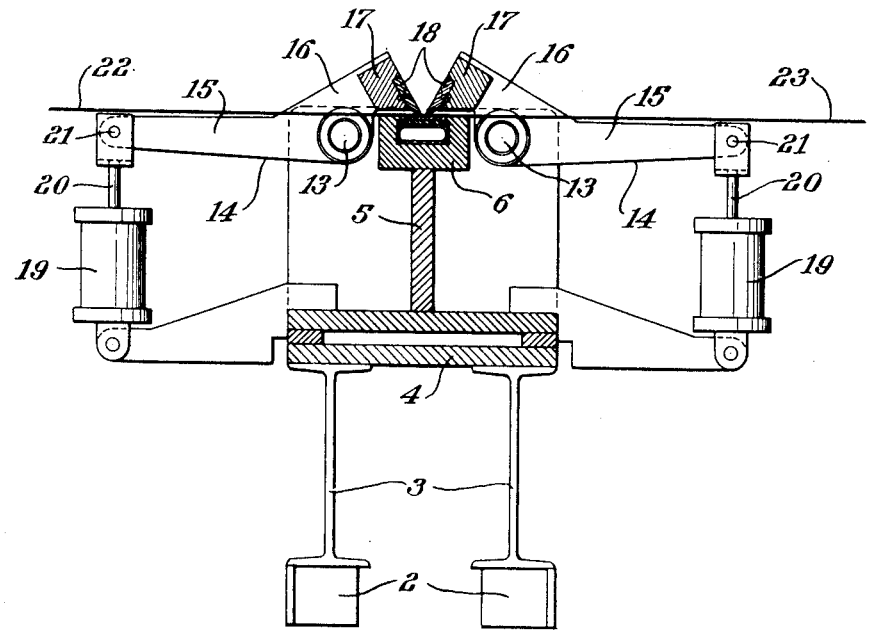
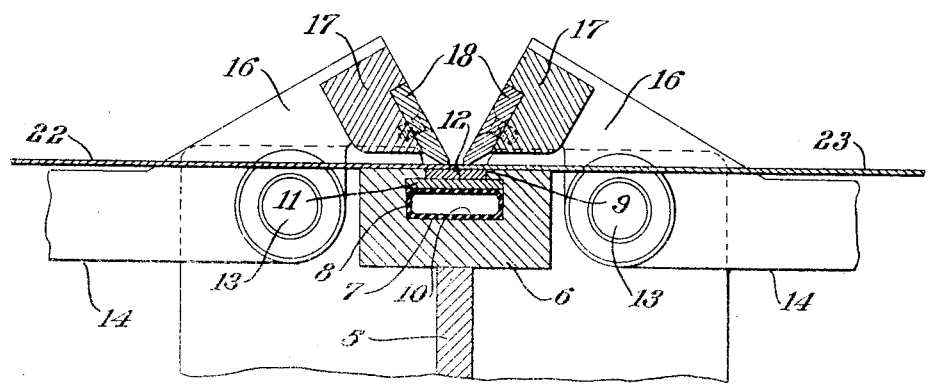

United States Patent Office 2,696,547
Patented Dec. 7, 1954

2,696,547

GRIPPING MEMBERS FOR BONDING

John M. Felton, Wellsburg, W. Va., and Clarence H. Verwohlt, St. Clairsville, Ohio, assignors to Wheeling Steel Corporation, Wheeling, W. Va., a corporation of Delaware Application April 10, 1951, Serial No. 220,246

4 Claims. (Cl. 219—17)

This invention relates to gripping members for bonding. While the invention is applicable in various fields it has especial utility in the gripping of metal members for electric welding. For purposes of explanation and illustration the invention will be described as embodied and practiced in the gripping of silicon steel sheets for electric welding.

The electric welding of silicon steel sheets presents difficult problems and has even recently been considered by some of those skilled in the art as impossible or at least commercially impractical. It has been very difficult to obtain a continuous uniform weld. Heretofore silicon steel sheets have been welded together by flame welding.

It is possible to weld together silicon steel sheets electrically, one preferred method involving the employment of an arc protected by an envelope of helium gas. However, uniformly satisfactory results have not heretofore been obtainable, which accounts for the fact that flame welding has heretofore been employed in the welding of silicon steel sheets. We have found that the inability to achieve uniformly satisfactory results is due to the fact that the edges to be welded together have not been brought together at the welding zone uniformly throughout the length of the weld. The problem is in the gripping or clamping of the sheets.

We have been able to solve the problem through clamping or gripping in a novel way the sheets or other members to be welded or otherwise bonded together.

In gripping members for bonding we position members with edges to be bonded together disposed in contiguous relation against a supporting surface and press the members toward the supporting surface and relatively toward each other to press the edges tightly against each other. We preferably engage the members respectively adjacent the edges and thereby press the members toward the supporting surface and also by such engagement press at least one of the members toward the other to relatively press the edges tightly against each other. Desirably we press both members toward the supporting surface and each toward the other.

We desirably resiliently support the supporting surface to permit slight movement thereof when the members are gripped and press the members against the supporting surface to grip the members and slightly resiliently move the supporting surface to insure uniform gripping of the members along the edges.

We provide apparatus for gripping members for bonding comprising a support against which members are adapted to be positioned with edges to be bonded together disposed in contiguous relation and means for pressing the members toward the support and relatively toward each other to press the edges tightly against each other. We preferably provide clamps engaging the members respectively adjacent the edges and means operating the clamps to press the members toward the supporting surface, at least one of the clamps being so constructed and arranged that it is operated by its operating means to press one of the members toward the other to relatively press the edges tightly against each other. At least one of the clamps is preferably pivoted about an axis generally parallel to the edges to be bonded together, said axis being offset from the surface in a direction opposite the direction therefrom of the portion of the clamp which engages one of the members and also being more remote from the edges to be bonded together than said portion of the clamp so that that clamp is engaging one of the members adjacent its edge presses the member not only toward the supporting surface but also toward the other member to relatively press the edges tightly against each other. Preferably both clamps are of such construction.

We further provide apparatus for gripping members for bonding comprising a support against which members are adapted to be positioned with edges to be bonded together disposed in contiguous relation, means resiliently supporting the support to permit slight movement thereof when the members are gripped and means for pressing the members adjacent the edges against the support to grip the members and slightly resiliently move the support to insure uniform gripping of the members along the edges. The resilient supporting means preferably includes a flexible fluid container and means constantly maintaining the container filled with fluid under pressure. We desirably employ a backing member having a depression therein, a flexible fluid container in the depression, means constantly maintaining the container filled with fluid under pressure and a support for the members to be bonded together bearing against the flexible fluid container.

The means resiliently supporting the support cooperates with the means for pressing the members toward the support and relatively toward each other to insure a continuous uniform firm gripping of the edges and pressing of the edges together. The resilient support yields slightly under the clamping pressure to enable each clamp to engage one of the members uniformly along a line adjacent its edge and to press it against the other member with properly equalized pressure along the edges.

We preferably employ clamping means comprising a clamping element adapted to engage one of the members generally parallel to the edge thereof to be bonded together with spaced apart individually operable operating means and connections between the respective operating means and the clamping element respectively adjacent the ends of the clamping element operable by the operating means to press the clamping element against the member to hold the member in position against the support. The spaced apart individually operable operating means are preferably resilient operating means and may take the form of spaced apart fluid presusre cylinders. We preferably employ pivoted levers each connected with one of the fluid pressure cylinders and with the clamping element adjacent an end of the clamping element operable to press the clamping element against the member to hold the member in position against the support. This feature has advantages in combination with the angularly movable clamping elements and the resiliently mounted support as will be explained.

As previously indicated, the invention is especially useful in clamping or gripping metal members such as metal sheets for welding and has been found to successfully solve long existing problems in the electric welding of silicon steel sheets. Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same in which Figure 1 is an elevational view partly in vertical cross section of apparatus for gripping members for bonding;

Figure 2 is a plan view of the apparatus shown in Figure 1;

Figure 3 is an elevational view of the apparatus shown in Figures 1 and 2 viewed at right angles to the view of Figure 1; and Figure 4 is an enlarged vertical cross-sectional view similar to a portion of Figure 1 showing details of the apparatus.

Referring now more particularly to the drawings, there is shown a base structure consisting of foundation members 2 carrying I-beams 3 which in turn carry a plate 4 which carries the mounting for the apparatus including a generally vertically extending member 5 carrying at its upper end a block 6 constituting a backing member and having therein a depression 7. The block 6 is elongated in the direction of an elongated bond to be formed between two members and the depression 7 is also elongated in the same direction. In the structure shown the depression 7 is in the form of a trough in the block 6, the trough having a relatively wide body 8 and a relatively narrow neck 9 where it opens upwardly at the upper surface of the block. The upper surface of the block serves, desirably in conjunction with supporting tables at either side thereof, as the support for the members whose edges are to be bonded together.

Disposed within the body portion 8 of the depression or trough 7 in the block 6 is a flexible fluid container 10. The container 10 may be in the form of a hose of rubber or other similar material, reinforced as may be appropriate, extending along the trough and closed and tightly sealed at both ends so that it is fluid tight. Disposed atop the container 10 is a plate 11 and disposed atop the plate 11 centrally thereof is a bar 12. The plate 11 extends longitudinally of the trough and is of the full width of the body portion 8 of the trough, underlying the overhanging lips defining the neck 9 of the trough. The bar 12 is of such shape as to fit snugly within the neck 9 of the trough but the bar is movable within the neck 9 as will be described.

The interior of the container 10 is connected by any suitable conduit, not shown, with a source of fluid under pressure and at all times during operation of the apparatus the container 10 is maintained filled with fluid under pressure. Any suitable fluid may be employed. We prefer to employ compressed air supplied by an air compressor under substantial pressure. The pressure is preferably regulated so as to be maintained substantially uniform, a pressure of eighty pounds per square inch being found satisfactory for the purpose. Thus the flexible fluid container 10 maintained under constant fluid pressure forms a resilient support for the plate 11 and the bar 12. The resilient support exerts upward pressure on the plate 11 to normally maintain it and the bar 12 in the position shown in Figure 4 with the upper surface of the bar 12 flush with the upper surface of the block 6. However, slight movement of the bar 12 and plate 11 is permitted when downward pressure is exerted upon the upper surface of the bar as will be explained.

The supporting framework for the apparatus carries four pivot pins 13, two at each side of the block 6. The pins 13 at each side of the block are disposed respectively adjacent the ends of the block so that the four pins which are mounted in the supporting framework are disposed respectively adjacent the four corners of the block 6. Pivoted upon each of the four pins 13 is a double-armed lever 14. Each lever 14 has a generally horizontal outwardly extending arm 15 and a somewhat upwardly and inwardly extending arm 16. The respective arms 16 of the two levers 14 at each side of the block 6 carry a bar 17 which in turn carries a clamping element 18. Each bar and clamping element assembly extends parallel to the length of the block 6 and may be substantially coextensive in length with the block. Each bar 17 is disposed generally above one side of the block and each clamping element 18 extends from its supporting bar 17 generally downwardly and inwardly so as to be positioned above the upper surface of the bar 12.

There are provided four fluid pressure cylinders 19 which are mounted upon the supporting structure of the apparatus, one below the outer extremity of each arm 15. Each cylinder 19 contains a piston from which a piston rod 20 extends upwardly and is connected with the corresponding arm 15 at 21. When the pistons in the cylinders 19 at one side of the block 6 are operated to move upwardly they cause the two corresponding levers 14 to turn to move the clamping element 18 carried thereby in an arc downwardly and inwardly until it engages the upper surface of the bar 12 or rather the upper surface of a member to be bonded which lies atop the block 6 with an edge disposed over the bar 12. Each clamping element 18 thus clamps one of two members to be bonded to each other in bonding position. The members are in bonding position when the edges thereof which are to be bonded together are disposed in contiguous relation substantially along the center line of the upper surface of the bar 12.

The pistons in the cylinders 19 may be operated by any suitable fluid. We prefer to employ air although oil or other suitable hydraulic or gaseous fluid may be used. Desirably the two pistons at one side of the block 6 are moved upwardly simultaneously to cause simultaneous movement of the corresponding levers 14. However, the separate application of resilient pressure to the two cylinders at opposite ends of the clamping element contributes to our improved results as will be explained.

The axes of the pins 13 are disposed below the level of the upper surface of the block 6 to insure that as the clamping elements 18 move downwardly toward the bar 12 they are at the same time moving inwardly toward the center line of that bar whereby to accomplish an important new and improved result as will now be explained.

In operation of the apparatus the clamps are initially open, i. e., the respective clamping elements 18 are positioned with their lower extremities spaced substantially above the upper surfaces of the block 6 and bar 12. A member to be bonded to another member is positioned with one of its edges substantially along the center line of the upper surface of the bar 12, the member extending beneath one of the clamping elements 18. With the member thus positioned that clamping element 18 is moved into clamping position to clamp the member down atop the bar 12 by admitting fluid below the pistons in the two cylinders 19 which operate that clamping element. Then the second of the two members to be bonded together is similarly positioned with an edge at the center line of the upper surface of the bar 12 opposed and contiguous to the edge of the first mentioned member. We desirably when initially positioning the second member move it against the previously positioned and clamped member so that the two edges are in contact throughout their length. Then the second clamping element 18 (the one for clamping the second member) is rendered operative by admission of fluid below the pistons in the two corresponding cylinders 19. The result is a downward and inward movement of the clamping element 18 so that it not only clamps down the second member against the upper surface of the bar 12 but also, due to the fact that the clamping element has a horizontal component of movement, tends to press the edge of the second member to be bonded against the edge of the first (previously clamped) member to be bonded, thereby consolidating the edges in close contact ready for the bonding operation. We find that the horizontal component of force imparted by the downwardly and inwardly moving clamping element to the member against which it operates importantly contributes to unprecedentedly uniform satisfactory results in bonding.

The clamps alone have the advantages above pointed out even if the flexible fluid container 10 resiliently supporting the bar 12 were not employed, and similarly the flexible fluid container has advantages when employed with various types of clamps, but the two features in combination importantly contribute to our new and improved results. By reason of the use of the flexible fluid container 10 resiliently supporting the bar 12, when the edges of the members to be bonded are thrust by the clamping elements against the upper surface of the bar 12 the bar 12 is permitted to yield very slightly at one or more points along its length to insure uniform tight gripping of the members to be bonded. A very tight uniform gripping of the members to be bonded is essential to optimum results and the yieldable or resilient mounting for the bar 12 insures such gripping.

Moreover, the yieldable or resilient mounting for the bar 12 cooperates specifically with the downward and inward movement of the clamping elements 18 as shown in Figure 4 in that the slight yielding of the bar 12 under the pressure of the clamping elements affords the clamping elements the opportunity of tightly forcing together the edges to be bonded. Still further, the independent application of resilient pressure at the respective ends of each of the clamping elements through the employment of two separate resilient operating devices such as the cylinders 19 also cooperates with the resilient support for the bar 12 and the downward and inward movement of the clamping elements in insuring automatic proper adjustment of each clamping element upon the member against which it operates to firmly clamp that member against the bar 12 and press it against the opposed member to which it is to be bonded.

While the members to be bonded may be of various characteristics, we have shown in the drawings sheets 22 and 23 which may be considered to be silicon steel sheets whose bonding together is especially difficult. When metal members such as metal sheets are to be bonded together the bonding is preferably effected by welding and desirably by electric welding. When electric welding is employed the bar 12 is preferably made of copper and acts as one of the electrodes, being connected into the electrical circuit of the welder in known manner.

The bonding step is preferably performed by moving a bonding element along the joint between the members after they have been clamped in place as above described. When the bonding is to be effected by electric welding the bonding element is a welding head or electrode mounted to be traversed over the work along the joint as well known in the art. We find that an electric weld with a helium gas protective envelope around the arc is well suited to the welding together of silicon steel sheets which have been clamped with their edges together as above described.

While we have shown and described a present preferred embodiment of the invention and a present preferred method of practicing the same it is to be distinctly understood that the invention is not limited thereto but may be otherwise variously embodied and practiced within the scope of the following claims.

We claim:

1. Apparatus for gripping members for bonding comprising a backing member having a depression therein, a flexible fluid container in the depression, means constantly maintaining said container filled with fluid under pressure, a support having a surface against which members are adapted to be positioned with edges to be bonded together disposed in contiguous relation, the support bearing against the flexible fluid container, clamps opposed to the support engaging the members respectively adjacent the edges and means operating the clamps to press the members toward the supporting surface, each of the clamps being pivoted about an axis generally parallel to the edges to be bonded together, said axis being offset from the surface in a direction opposite the direction therefrom of the portions of the clamps which engage the members and also being more remote from the edges to be bonded together than said portion of the corresponding clamp so that each clamp in engaging one of the members adjacent its edge presses the member not only toward the supporting surface but also toward the other member whereby the edges are pressed tightly against each other, the clamping of the members slightly resiliently moving the support to insure uniform gripping of the members along the edges.

2. Apparatus for gripping generally planar members for bonding comprising a generally planar depressible supporting surface against which edges to be bonded together of the generally planar members are disposed in abutting relation, means for clamping one of the members, immediately adjacent the edge thereof to be bonded, to the generally planar supporting surface, clamping means having a straight edge engaging the other member immediately adjacent the edge thereof to be bonded, means mounting the second mentioned clamping means for movement in a direction at an acute angle to the second mentioned member toward the second mentioned member and the generally planar supporting surface and toward the abutting edges and means actuating the mounting means to so move the second mentioned clamping means.

3. Apparatus for gripping generally planar members for bonding comprising an element having a generally planar surface against which edges to be bonded together of the generally planar members are disposed in abutting relation, means depressibly supporting said element, means for clamping one of the members, immediately adjacent the edge thereof to be bonded, to the generally planar supporting surface, clamping means having a straight edge engaging the other member immediately adjacent the edge thereof to be bonded, means mounting the second mentioned clamping means for movement in a direction at an acute angle to the second mentioned member toward the second mentioned member and the generally planar surface and toward the abutting edges and means actuating the mounting means to so move the second mentioned clamping means.

4. Apparatus for gripping generally planar members for bonding comprising a generally planar depressible supporting surface against which edges to be bonded together of the generally planar members are disposed in abutting relation, opposed clamping means each having a straight edge engaging the respective members adjacent the edges thereof to be bonded, means mounting each of the clamping means for movement in a direction at an acute angle to the one of said members to be clamped thereby toward said one of said members and the generally planar supporting surface and toward the abutting edges and means actuating the mounting means to so move the clamping means.

References Cited in the file of this patent

UNITED STATES PATENTS

| Number | Name | Date |
| --- | --- | --- |
| 1,534,422 | Smith | Apr. 21, 1925 |
| 1,732,383 | Sessions | Oct. 22, 1929 |
| 2,011,926 | Birmingham | Aug. 20, 1935 |
| 2,143,969 | Biggert | Jan. 17, 1939 |
| 2,176,664 | Burke | Oct. 17, 1939 |
| 2,412,648 | Rendell | Dec. 17, 1946 |
| 2,459,625 | Copp | Jan. 18, 1949 |
| 2,631,215 | Randall | Mar. 10, 1953 |